(12) United States Patent
Wu et al.

(10) Patent No.: US 9,501,792 B2
(45) Date of Patent: Nov. 22, 2016

(54) SYSTEM AND METHOD FOR A GRAPHICAL USER INTERFACE INCLUDING A READING MULTIMEDIA CONTAINER

(71) Applicant: RAKUTEN KOBO, INC., Toronto (CA)

(72) Inventors: James Wu, Toronto (CA); Robin Bennett, Toronto (CA); Tony O'Donoghue, Toronto (CA); Daniel Hill, Toronto (CA)

(73) Assignee: RAKUTEN KOBO, INC., Toronto (CA)

( * ) Notice: Subject to any disclaimer, the term of this patent is extended or adjusted under 35 U.S.C. 154(b) by 326 days.

(21) Appl. No.: 13/948,941

(22) Filed: Jul. 23, 2013

(65) Prior Publication Data

US 2014/0068430 A1  Mar. 6, 2014

Related U.S. Application Data

(60) Provisional application No. 61/697,077, filed on Sep. 5, 2012.

(51) Int. Cl.
| | |
|---|---|
| *G06F 15/00* | (2006.01) |
| *G06F 13/00* | (2006.01) |
| *G06Q 30/06* | (2012.01) |
| *G06T 11/60* | (2006.01) |
| *G06F 17/21* | (2006.01) |
| *G06F 3/0481* | (2013.01) |
| *G06F 3/0485* | (2013.01) |
| *G06Q 10/10* | (2012.01) |
| *G06Q 50/00* | (2012.01) |

(52) U.S. Cl.
CPC .......... *G06Q 30/0631* (2013.01); *G06F 3/0485* (2013.01); *G06F 3/04812* (2013.01); *G06F 17/212* (2013.01); *G06Q 10/10* (2013.01); *G06Q 50/01* (2013.01); *G06T 11/60* (2013.01)

(58) Field of Classification Search
CPC ............................... G06F 17/30; H04L 29/06
USPC ....... 715/848, 810, 839, 764, 781, 769, 830, 715/776, 767
See application file for complete search history.

(56) References Cited

U.S. PATENT DOCUMENTS

| | | | | |
|---|---|---|---|---|
| 6,243,093 | B1 * | 6/2001 | Czerwinski et al. | 715/848 |
| 2002/0180803 | A1 * | 12/2002 | Kaplan et al. | 345/810 |
| 2006/0139318 | A1 * | 6/2006 | Kariathungal | G06F 3/013 345/156 |
| 2009/0002335 | A1 * | 1/2009 | Chaudhri | 345/173 |

(Continued)

*Primary Examiner* — Kevin Nguyen
(74) *Attorney, Agent, or Firm* — Oblon, McClelland, Maier & Neustadt, L.L.P.

(57) ABSTRACT

A system and method for a graphical user interface including a multimedia container. The method includes accessing, within a mobile device, a first data store corresponding to a multimedia container and accessing a second data store. The multimedia container comprises a first object and the multimedia container is operable to comprise one or more applications, widgets, and pieces of content. The second data store comprises data corresponding to a first electronic book. The method further includes displaying a first image corresponding to the first object, where the first image comprises a first book cover image corresponding to the first electronic book. The first image further comprises a first statistic corresponding to the first electronic book and the first statistic is related to access of the first electronic book.

17 Claims, 9 Drawing Sheets

(56) References Cited

U.S. PATENT DOCUMENTS

2012/0324392 A1* 12/2012 Mbenkum ......... G06F 17/30873
  715/776
2014/0193787 A1* 7/2014 Marcewicz ............ G09B 19/00
  434/236
2015/0026176 A1* 1/2015 Bullock ........................ 707/736

* cited by examiner

600

SYSTEM AND METHOD FOR A GRAPHICAL USER INTERFACE INCLUDING A READING MULTIMEDIA CONTAINER

CROSS REFERENCE TO RELATED APPLICATIONS

This application claims the benefit of and priority to the copending provisional patent application Ser. No. 61/697,077, entitled "SYSTEM AND METHOD OF PROVIDING A USER INTERFACE ON A MOBILE DEVICE," with filing date Sep. 5, 2012, and hereby incorporated by reference in its entirety.

This application is related to non-provisional patent application Ser. No. 13/901,363, entitled "SYSTEM AND METHOD FOR A MULTIMEDIA CONTAINER," with filing date May 23, 2013, and hereby incorporated by reference in its entirety.

This application is related to non-provisional patent application Ser. No. 13/901,429, entitled "SYSTEM AND METHOD FOR MANAGING OBJECTS IN A MULTIMEDIA CONTAINER," with filing date May 23, 2013, and hereby incorporated by reference in its entirety.

This application is related to non-provisional patent application Ser. No. 13/901,465, entitled "SYSTEM AND METHOD FOR DISPLAYING A MULTIMEDIA CONTAINER," with filing date May 23, 2013, and hereby incorporated by reference in its entirety.

This application is related to non-provisional patent application Ser. No. 13/901,498, entitled "SYSTEM AND METHOD FOR A HOME MULTIMEDIA CONTAINER," with filing date May 23, 2013, and hereby incorporated by reference in its entirety.

This application is related to non-provisional patent application Ser. No. 13/931,563, entitled "SYSTEM AND METHOD FOR A GRAPHICAL USER INTERFACE INCLUDING RECOMMENDATIONS," with filing date Jun. 28, 2013, and hereby incorporated by reference in its entirety.

FIELD OF THE INVENTION

Embodiments of the present invention are generally related to graphical user interfaces that may be part of a mobile device operating system.

BACKGROUND

As computing technology has advanced, computers have become smaller and more portable thereby bringing about powerful handheld devices capable of performing functions of more traditional computing technology. These advancements have resulted in rapid growth in sales of mobile devices. The portable nature and corresponding smaller size of mobile devices means that mobile devices can be used for an increasing number of tasks including collecting and displaying electronic books.

Typically, a user needs to open an electronic book or reading application before accessing an electronic book. Upon opening the electronic book reading application, the user is presented with a list of books or a grid of books within his or her library. Further, a user needs to open an electronic book application or electronic book store application to browse and purchase books to be added to his or her library.

SUMMARY OF THE INVENTION

Accordingly, what is needed is a solution to allow an electronic book to be presented to a user in an easy to access manner. Embodiments of the present invention are operable to bring users closer to their reading content. In one embodiment, a reading multimedia container comprises content (e.g., preloaded and downloaded) and widgets that allow a user to browse and select electronic books. The widgets may be focused on different types or categories of reading content. Embodiments of the present invention allow a user to browse and consider books prior to entering an electronic book application to buy or read an electronic book. Embodiments of the present invention thereby expose a user to electronic books within an electronic book store or marketplace without a user having to launch an electronic book store or marketplace application. Embodiments of the present invention further allow a user to see his or her most recently read books and the corresponding history of the user's interaction with each book (e.g., based on a user's reading patterns with each respective electronic book).

In one embodiment, the present invention is directed to a method for rendering a graphical user interface. The method includes accessing, within a mobile device, a first data store corresponding to a multimedia container and accessing a second data store. The multimedia container comprises a first object and the multimedia container is operable to comprise one or more applications, widgets, and pieces of content. In one embodiment, the first object is a widget. The second data store comprises data corresponding to a first electronic book. The method further includes displaying a first image corresponding to the first object, where the first image comprises a first book cover image corresponding to the first electronic book. The first image further comprises a first statistic corresponding to the first electronic book and the first statistic is related to access of the first electronic book. In one embodiment, the first statistic comprises a percent complete of the electronic book.

The first image may further comprise a second statistic of a reading time of the electronic book. The first image may further comprise a third statistic of a time remaining to complete the electronic book. In one embodiment, the third statistic is based on a rate that a user is reading the electronic book. The first image may further comprise a second book cover image corresponding to a second electronic book, and wherein the second electronic book is a recommended book. The multimedia container may further comprise a second object, where the second object is an application, and the method further comprises displaying an icon corresponding to the application to the left of the first image.

In one embodiment, the present invention is directed toward a computer-readable storage medium having stored thereon, computer executable instructions that, if executed by a computer system cause the computer system to perform a method for displaying a graphical user interface. The method includes displaying, on a mobile device, a first image comprising a first book cover corresponding to a first electronic book, where the first image further comprises a first piece of access data related to the first electronic book. The method further includes displaying a first portion of a second image, where a second image comprises a second book cover corresponding to a second electronic book and in response to an interaction with the first image, displaying the second image. The second image further comprises a second piece access data related to the second electronic book. In one embodiment, the interaction with the first image comprises a swiping motion. The first piece of access data comprises a percent complete of the electronic book. The first piece of access data may further comprise a first statistic of a reading time of the electronic book. The first image may further comprise a second statistic of a time remaining to complete the electronic book. In one embodiment, the first image further comprises a third statistic based on a rate that a user is reading the electronic book.

The method may further include displaying a third image comprising a third book cover corresponding to a third electronic book and a fourth book cover corresponding to a fourth electronic book. The user's library may comprise the first electronic, second electronic book, third electronic book, and fourth electronic book. In one embodiment, a second portion of the second image is covered by the first image and the first image and the second image are in a stacked configuration.

In another embodiment, the present invention is implemented as a system for displaying a graphical user interface. The system includes a data store access module operable to access a data store corresponding to a plurality of electronic books and a statistic determination module operable to compute a respective plurality of statistics related to access of a respective electronic book. The system further includes a display module operable to display a respective image for each of the plurality of electronics books. The respective image comprises a respective book cover image corresponding to the respective electronic book and the respective plurality of statistics. In one exemplary embodiment, the respective plurality of statistics comprises a percent completed, a reading time, and a time remaining.

The system may further include a recommendation module operable to determine a respective recommended electronic book corresponding to the respective electronic book. The respective image further comprises a second respective book cover image corresponding to the respective recommended electronic book. In response to a user interaction, the display module is operable to display a next respective image for a next respective electronic book, where the plurality of electronic books are ordered according to most recent access.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
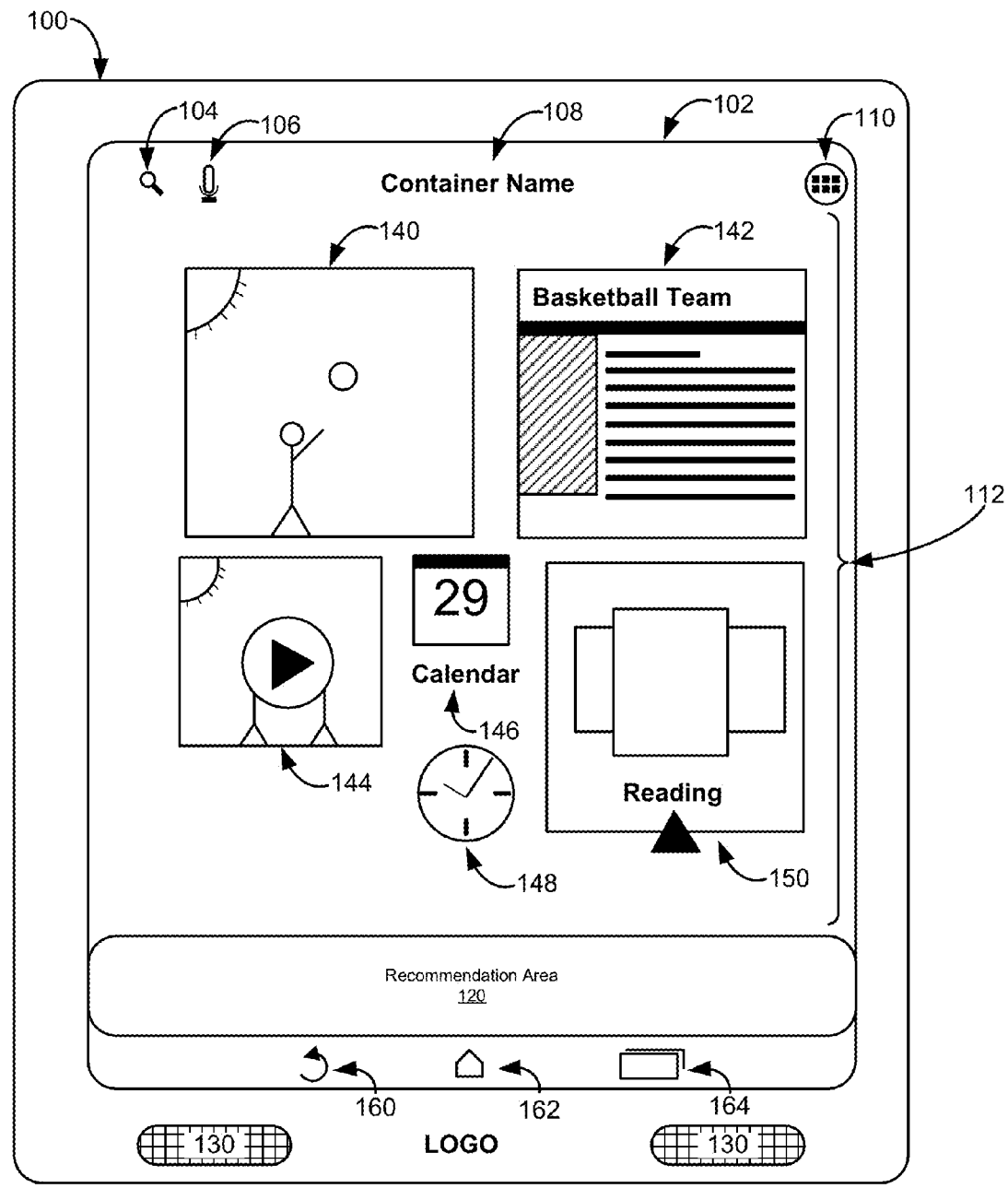
FIG. 1 shows an exemplary mobile device and an exemplary graphical user interface in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., system 900 of FIG. 9), or similar electronic computing device, that manipulates and transforms data represented as physical (electronic)

quantities within the computer system's registers and memories into other data similarly represented as physical quantities within the computer system memories or registers or other such information storage, transmission or display devices.

Exemplary Systems and Methods for a Graphical User Interface Including a Reading Multimedia Container Embodiments of the present invention are operable to bring users closer to their reading content. In one embodiment, a reading multimedia container comprises content (e.g., preloaded and downloaded) and widgets that allow a user to browse and select electronic books. The widgets may be focused on different types or categories of reading content. Embodiments of the present invention allow a user to browse and consider books prior to entering an electronic book application to buy or read an electronic book. Embodiments of the present invention thereby expose a user to electronic books within an electronic book store or marketplace without a user having to launch an electronic book store or marketplace application. Embodiments of the present invention further allow a user to see his or her most recently read books and the corresponding history of the user's interaction with each books (e.g., based on a user's reading patterns with each respective electronic book).

FIGS. 1-6 illustrate example components used by various embodiments of the present invention. Although specific components are disclosed in FIGS. 1-6, it should be appreciated that such components are exemplary. That is, embodiments of the present invention are well suited to having various other components or variations of the components recited in FIGS. 1-6. It is appreciated that the components in FIGS. 1-6 may operate with other components than those presented, and that not all of the components of FIGS. 1-6 may be required to achieve the goals of embodiments of the present invention.

FIG. 1 shows an exemplary mobile device and an exemplary multimedia container of an exemplary graphical user interface in accordance with one embodiment of the present invention. FIG. 1 depicts an exemplary graphical user interface comprising an exemplary multimedia container displayed by a device (e.g., tablet computing device, mobile phone, smartphone, or the like) and a recommendations area.

In one embodiment, device 100 is a mobile computing device (e.g., tablet). Device 100 comprises speakers 130 and screen 102. In one embodiment, screen 102 is a touch sensitive screen (e.g., a capacitive touch screen) operable to receive input (e.g., from a user via one or more fingers) and display a graphical user interface. Speakers 130 are operable for output of audio during rendering of content (e.g., video, video games, animations, system functions, etc.).

Device 100 is operable to render a graphical user interface comprising a multimedia container. A multimedia container is a graphically navigable container that is operable to hold various objects of various media types (e.g., content), applications, and widgets. A multimedia container may include other multimedia containers therein which may further include respective content, applications, widgets, etc. Multimedia containers display content in a pictorial manner thereby surfacing content for immediate consumption.

FIG. 1 depicts an exemplary graphical user interface rendered by device 100. The exemplary graphical user interface comprises search icon 104, voice recognition icon 106, container name 108, applications icon 110, object area 112, recommendation area 120, and controls icon 160-164. It is noted the objects within the multimedia container described below are exemplary and embodiments of the present invention can support more or less objects.

Object area 112 comprises pieces of content, application icons, and widgets of a multimedia container. In one exemplary embodiment, object area 112 includes image 140, website image 142, video image 144, application icon 146, widget 148, and multimedia container image 150. Pieces of content may be shown in pictorial form (e.g., without filenames). Objects in object area 112 can be resized by a user. Objects within object area 112 are selectable to launch a corresponding application or corresponding application for rendering content corresponding to the object in object area 112. Objects within object area 112 may be moved around (e.g., via dragging after selection via pressing and holding) or resized (e.g., via pressing and holding and manipulating a size control).

Image 140 is an image (e.g., scaled image, thumbnail, or the like) corresponding to an image that is stored on device 100. In one exemplary embodiment, image 140 is a scaled version of a child playing basketball (e.g., with a filename). Image 140 is selectable (e.g., via a touch or press) and is operable to launch an image viewing application to display an image corresponding to image 140 at full resolution. For example, a user can view image 140 at one resolution within the multimedia container and to see more detail a user can select image 140 to see the high resolution image that image 140 corresponds thereto.

Website image 142 corresponds to a rendering of a webpage (e.g., via a browser). In one exemplary embodiment, website image 142 is a scaled version of a rendering of the webpage according to a size specified corresponding to a multimedia container. In another embodiment, website image 142 is an image determined and selected from the content of the website corresponding to website image 142. Website image 142 is operable to be selected (e.g., via a touch or press) and is operable to launch a web browser to display the website corresponding to website image 142. Website image 142 and other objects within a multimedia container may be updated periodically (e.g., hourly, daily, and the like). In one embodiment, website image 142 and other objects are updated each time a user accesses the content corresponding to the object (e.g., the website corresponding to website image 142).

Video image 144 corresponds to a video (e.g., stored locally on device 100 or available over a communications network). In one embodiment, video image 144 is a scaled version (e.g., thumbnail) of a key frame of a video with an optional title. In one exemplary embodiment, video image 144 is a scaled version of a key frame of the video scaled according to a size specified corresponding to a multimedia container. Video image 144 is operable to be selected (e.g., via a touch or press) and is operable to launch a video application (e.g., for a video stored locally on device 100 or available for streaming) or launch a website with the video corresponding to video image 144.

Application icon 146 corresponds to an application and is selectable to launch the corresponding application. In one exemplary embodiment, application icon 146 corresponds to a calendar application and application icon 146 comprises an image of a calendar with the current date and text below with the name of the application.

Widget 148 is a widget and is operable to display live, auto-updating content. In one exemplary embodiment, widget 148 is a clock widget operable to display the current time. In one embodiment, widget 148 is operable to be selected (e.g., via touch or press) and upon selection launch a corresponding application (e.g., a clock application with alarm, timer, and stopwatch functionality).

Recommendation area 120 is operable to display recommendations of content (e.g., free or pay content) based on the objects of a multimedia container (e.g., based on the metadata associated with the objects of a multimedia container). In one embodiment, recommendation area 120 includes images representing content that is recommended based on the pieces of content (and/or applications and widgets) in the multimedia container. In one exemplary embodiment, an exemplary implementation of a recommendation area is a discover bar or ribbon available from Kobo Inc. of Toronto, Canada.

Multimedia container image 150 is a reading related multimedia media container which may include reading related objects (e.g., electronic book related application, widgets, and content). In one embodiment, display of multimedia container image 150 comprises images of objects within the multimedia container corresponding to multimedia image 150. In one exemplary embodiment, multimedia container image 150 includes an outer frame and triangle to indicate to a user that multimedia container image 150 corresponds to a multimedia container and selecting (e.g., via touch or press) the multimedia container image 150 launches display of the multimedia container. Multimedia container image 150 may be selected with a press and hold interaction and then dragged around to move multimedia container image 150.

Control icons 160-164 are operable for navigation of a plurality of multimedia containers and switching applications. Back control 160 is operable for navigation to a previous multimedia container. Home control 162 is operable for navigating to a home multimedia container. Recent apps button 164 is operable to invoke a function for changing applications.

Figure 2:
FIG. 2 shows an exemplary graphical user interface of a reading multimedia container in accordance with one embodiment of the present invention.

FIG. 2 shows an exemplary graphical user interface of a reading multimedia container in accordance with one embodiment of the present invention. FIG. 2 depicts an exemplary graphical user interface comprising a portion of reading multimedia container having applications and widgets that allow access to various reading related pieces of content. In one embodiment, exemplary graphical user interface 200 includes elements similar to exemplary graphical user interface 100. Exemplary graphical user interface 200 includes application icons 202-208, library widget 210, merchandising widget 212, container name 222, and exemplary recommendation area 220. In one exemplary embodiment, applications 202-208 are organized on the left (e.g., top to bottom) and a plurality of widgets (e.g., library widget 210 and merchandising widget 212) related to reading are located to the right.

In one exemplary embodiment, exemplary graphical user interface 200 depicts a reading multimedia container with container name 222 of "Reading." The reading multimedia container may be a multimedia container operable to include objects (e.g., applications, widgets, and pieces of content such as books) related to reading that allow a user to quickly access one or more electronic books. In one embodiment, an exemplary implementation of exemplary graphical user interface 200 is a reading tapestry available from Kobo, Inc. of Toronto, Canada. A user may add content (e.g., electronic books, music, and websites), applications, widgets, etc., and thereby customize the reading multimedia container.

Application icons 202-208 correspond to applications related to reading. In one exemplary embodiment, application icons 202-208 are located on a left side column of a reading multimedia container and extend from the top to bottom of the multimedia container. In one embodiment, application icon 202 when selected launches a library application operable to allow a user to access and/or browse electronic books within the user's library (e.g., purchased, borrowed, and free electronic books). Application icon 204 when selected launches a store or marketplace application where a user can browse and download electronic books (e.g., download purchased or free books). Application icon 206 when selected launches an application for a user to configure his or her profile. Application icon 208 when selected launches a help application operable to help a user with reading electronic books and answer electronic book related issues and questions.

Library widget 210 is operable to display information corresponding to each electronic book in a user's personal library. In one exemplary embodiment, each electronic book of a user's personal library is represented by an image (e.g., similar to an index card) comprising an image of the book cover, statistics about the user's reading of the book (e.g. based on a user's reading patterns), and related or recommended books. The statistics about the user's reading of the book may include the percent completed or the amount (e.g., paragraphs or pages in an electronic publication (EPUB) format) of the book that the user has read, the time spent reading the book so far (e.g., in seconds and minutes), and the time (e.g., estimated) remaining to finish reading the book. The time remaining to finish reading the book may be calculated based on the rate as which the user has read a portion of the book in the tracked amount of reading time. The statistics about the user's reading of a book may be estimated or predicted.

Merchandising widget 212 is operable to display book covers of a plurality of electronic books for a particular category. In one embodiment, the book covers of the plurality of books are depicted on a shelf or book shelf. The plurality of books may have been determined based on the category and current selling goals (e.g., of a merchandising department).

Recommendation area 220 displays recommended items (e.g., pieces of content, applications, widgets, etc.) based on the contents of the reading multimedia container. In one exemplary embodiment, the recommendations of recommendation area 220 are based on the electronic book that the user is currently reading (e.g., based on the contents of the most recently accessed electronic book).

Figure 3A:
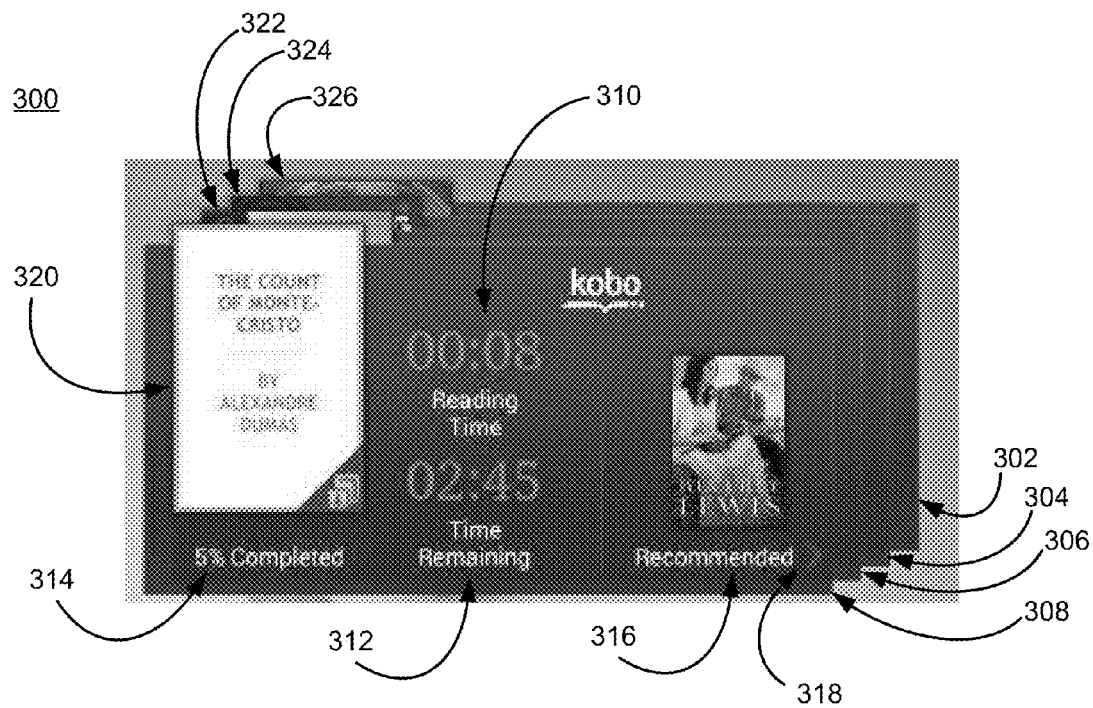
FIG. 3A shows an exemplary graphical user interface of an exemplary library object in accordance with one embodiment of the present invention.

FIG. 3A shows an exemplary graphical user interface of an exemplary library object in accordance with one embodiment of the present invention. FIG. 3A depicts an exemplary graphical user interface 300 of a widget for browsing and selecting books from a user's library of electronic books. Exemplary graphical user interface 300 includes images 302-308. Images 302-308 include book cover images 320-326 respectively and have respective statistics 310-314, respective recommended area 316, and respective arrow icon 318. It is noted that images 302-306 each have respective statistics and recommended areas similar to statistics 310-314, recommended area 316, and arrow icon 318 which are not shown in exemplary graphical user interface 300 due to the deck or stacked nature of images 302-308.

Images 302-208 may be displayed as a three dimensional (3D) stack, deck, or pile (e.g., to allow a user to see his or her most recent reads or most recently purchased electronic books). Images 302-308 may be arranged according to how recently the electronic book corresponding to images 302-308 has been accessed. For example, images 302-308 may each be displayed with image 308, corresponding to a most recently accessed electronic book, above image 306, corresponding to the next most recently accessed electronic book, above image 304, corresponding to the next most recently accessed electronic book, above image 302, corresponding to the next most recently (or last most recently accessed) electronic book.

Image 302-308 may be operable for selection by a swiping or pulling down motion to present the next image thereby allowing a user to scroll through the books in his or her library. For example, a user may swipe image 308 which results in a falling animation of image 308 and image 308 is moved to the bottom under images 302-306. Image 306 becomes the top most image and is displayed above images 302, 304, and 306.

In one embodiment, book cover images 320-326 correspond to each electronic book of a user's library. Embodiments of the present invention support more than four electronic books and the exemplary widget of exemplary graphical user interface 300 is operable to support any number of electronic books. Books cover images 320-326 correspond to electronic books that were accessed or read recently or electronic books that were purchased recently. Selection of book cover images 320-326 may invoke further display of information about the book and allow a user to launch an electronic book marketplace application to purchase and/or download the electronic book. Book cover images 320-326 may be selected to open an application to display the electronic book corresponding to the respective book cover image of book cover images 320-326.

Statistics 310-314 include the percent completed 314 or the amount (e.g., paragraphs or pages) of the book that the user has read, reading time 310 representing the time spent reading the book so far (e.g., accumulated minutes and seconds), and time remaining 312 representing the time remaining to finish reading the book. Time remaining 312 may be calculated based on the rate as which the user has read a portion of the book in the amount of reading time. For example, if a user takes three hours to reach 50% of the book, the time remaining will be computed to be three hours to complete the book.

Recommended area 316 includes a book cover image representing an electronic book recommended or related based on the electronic book corresponding to image 308 and represented by book cover image 320. In one embodiment, recommended area 316 further includes an arrow icon 318 (e.g. a red arrow) operable to indicate to a user that he or she can select the word recommended and be brought to a recommended area or category of an electronic book store upon selection of the arrow icon 318 or recommended area 316. In one embodiment, recommended books are determined by analyzing the books purchased by a user and looking at what other users have bought. For example, if user has brought a book by author John Smith, electronic books by author Bob Smith may be recommended books based on other users who have brought books by author John Smith also buying books by author Bob Smith.

Figure 3B:
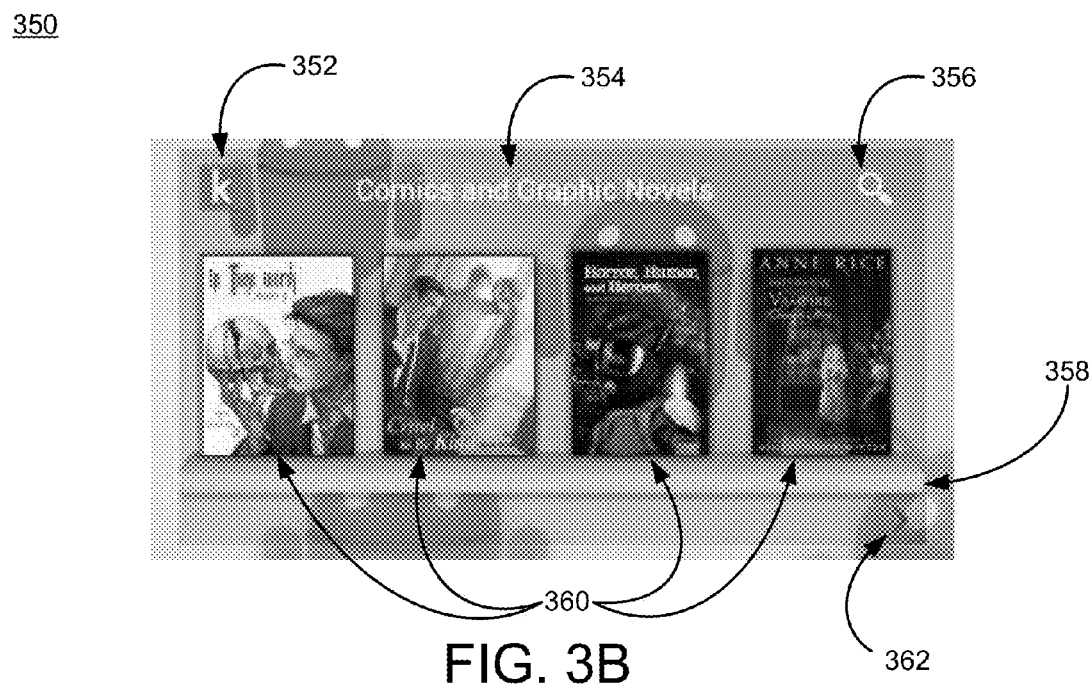
FIG. 3B shows an exemplary graphical user interface of a merchandising object in accordance with one embodiment of the present invention.

FIG. 3B shows an exemplary graphical user interface of a merchandising object in accordance with one embodiment of the present invention. FIG. 3B depicts an exemplary graphical user interface 350 of an exemplary merchandising widget including a plurality of book covers corresponding to electronic books of a particular category.

Exemplary graphical user interface 350 includes icon 352, category 354, search icon 356, book cover images 360, shelf image 358, and arrow icon 362. In one embodiment, icon 352 represents a brand of an electronic book store. Category 354 shows a category corresponding to the electronic books represented by book covers 360. In one exemplary embodiment, category 354 shows a comics and graphic novels category. Search icon 356 is operable upon selection to launch a search function of an electronic book store application.

Book covers 360 correspond to selected electronics books in the category represented by category 354. In one embodiment, selection of one or more book covers 360 launches an electronic book store application and displays information about the electronic book corresponding to the selected book cover. In one exemplary embodiment, book covers 360 correspond to electronic books that are determined or selected by a remote source (e.g., an electronic book seller's merchandising department). Shelf image 358 depicts an image of a book shelf or other physical object as holding the books represented by book covers 360 to create a familiar look to a user. Arrow icon 362 (e.g., red arrow) is operable to indicate to a user that he or she can select arrow icon 362 and be brought to the comic and graphics novels area of an electronic book store.

Figure 4A:
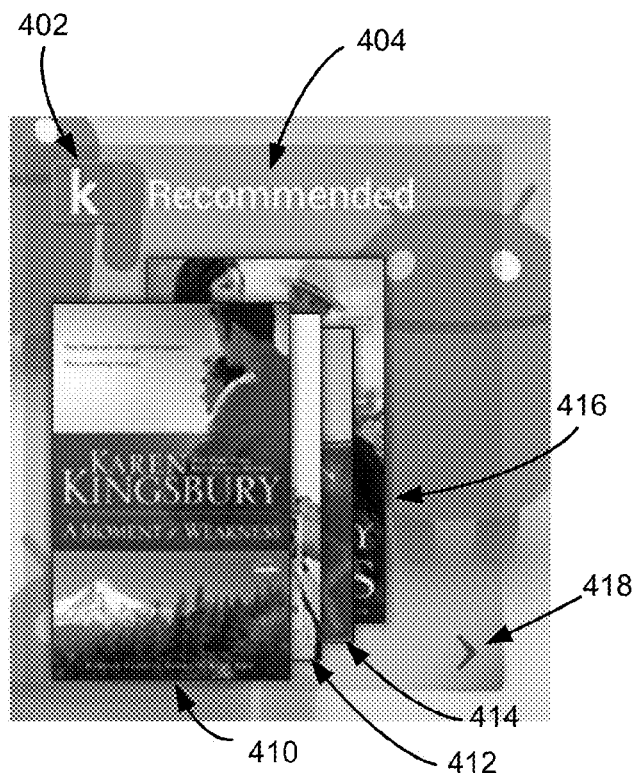
FIG. 4A shows an exemplary graphical user interface of a recommendation object in accordance with one embodiment of the present invention.

FIG. 4A shows an exemplary graphical user interface of a recommendation object in accordance with one embodiment of the present invention. FIG. 4A depicts an exemplary graphical user interface 400 of an exemplary recommended widget for browsing and selecting recommended electronic books. Exemplary graphical user interface 400 includes icon 402 (optional), recommended label 404, book covers 410-416, and arrow icon 418.

In one embodiment, icon 402 represents a brand of an electronic book store. Recommended label 404 indicates that electronics books of exemplary recommendation widget as depicted by exemplary graphical user interface 400 are recommended (e.g., to a user based on electronic books in his or her library and his or her profile). Book covers 410-416 are book cover images of respective electronics books that are recommended to a user (e.g., based on a user's purchased electronic books and/or user profile).

Book covers 410-416 may be displayed as a stack, deck, or pile. Images 410-416 may be arranged according to a priority of the how strongly a recommended book correlates to a user's tastes. For example, book covers 410-416 may each be displayed with book cover 410, corresponding to a strongest recommendation, above book cover 412, corresponding to the next strongest recommendation, above book cover 414, corresponding to the next strongest recommendation, above book cover 416, corresponding to the next most (or least strong) recommendation. Arrow icon 418 is operable for selection and invoking an electronic book application operable to display each electronic book recommended for a user.

Figure 4B:
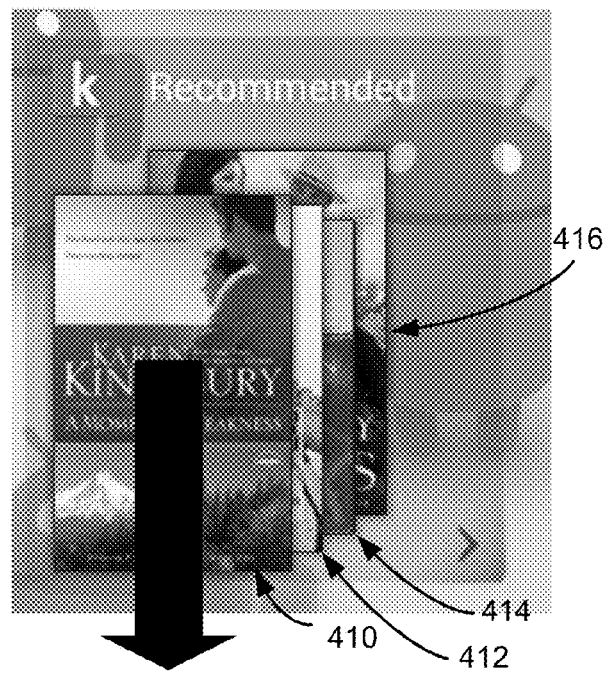
FIG. 4B shows an exemplary graphical user interface of a recommendation object with an exemplary user interaction in accordance with one embodiment of the present invention.

FIG. 4B shows an exemplary graphical user interface of a recommendation object with an exemplary user interaction in accordance with one embodiment of the present invention. Exemplary graphical user interface 450 depicts an exemplary interaction with exemplary graphical user interface 400.

Book covers 410-416 may be operable for selection by a swiping or pulling down motion to present the next image as represented by the black arrow of exemplary graphical user interface 450. For example, a user may swipe book cover 410 which results in a falling animation of book cover 410 and book cover 410 is moved to the bottom under book covers 412-416. Book cover 412 becomes the top most image or book cover and is displayed above book covers 414, 416, and 410, respectively. Book cover images 412-416 and 410 may be selected to open an application to display the electronic book corresponding to the respective book cover image of book cover images 410-416.

Figure 5:
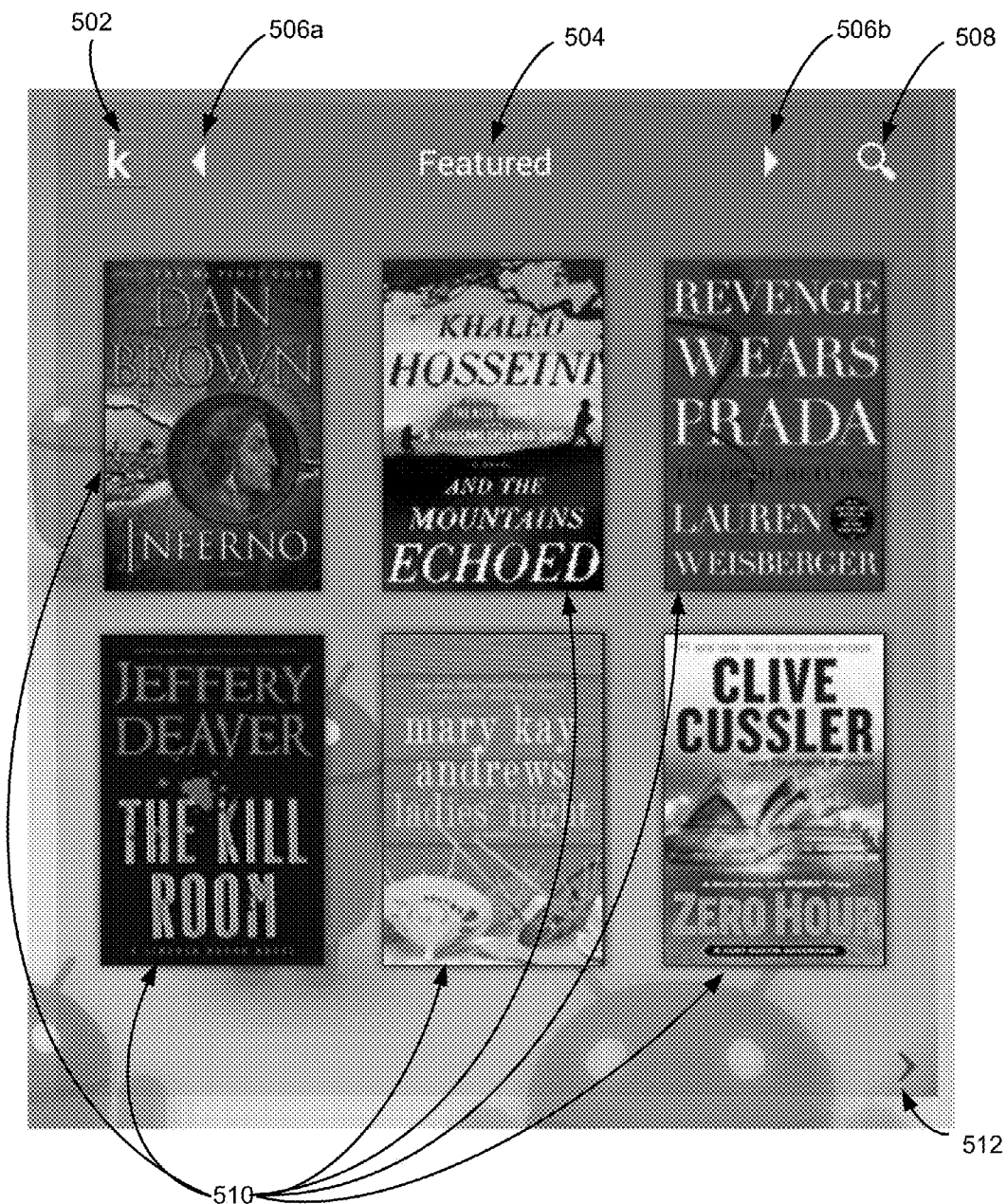
FIG. 5 shows an exemplary graphical user interface of a category object in accordance with one embodiment of the present invention.

FIG. 5 shows an exemplary graphical user interface of a category object in accordance with one embodiment of the present invention. FIG. 5 depicts an exemplary graphical user interface of an exemplary category widget operable to display a respective plurality of book covers corresponding to electronics books for each of a plurality of categories. Exemplary graphical user interface 500 includes icon 502 (optional), category label 504, category navigation icon 506*a-b*, search icon 508, book covers 510, and arrow icon 512.

In one embodiment, icon 502 represents a brand of an electronic book store. Category label 504 indicates the category that the electronics books displayed are from as depicted by exemplary graphical user interface 500. Book covers 510 are book cover images of respective electronics books that are within the category indicated by category label 504.

Category navigation icons 506*a-b* allows for navigation among a plurality of categories. Upon selection of either of navigation icons 506*a-b*, a next category is displayed including a set of book covers for the particular category and the updated or new category is indicated by category label 504. In one exemplary embodiment, the categories includes featured, top 50 (e.g., top 50 selling books), books with a pulse, and new releases. Arrow icon 512 upon selection is operable to bring a user to an area of an electronic book store corresponding to the displayed category. Search icon 508 is operable upon selection to launch a search function of an electronic book store.

Figure 6:
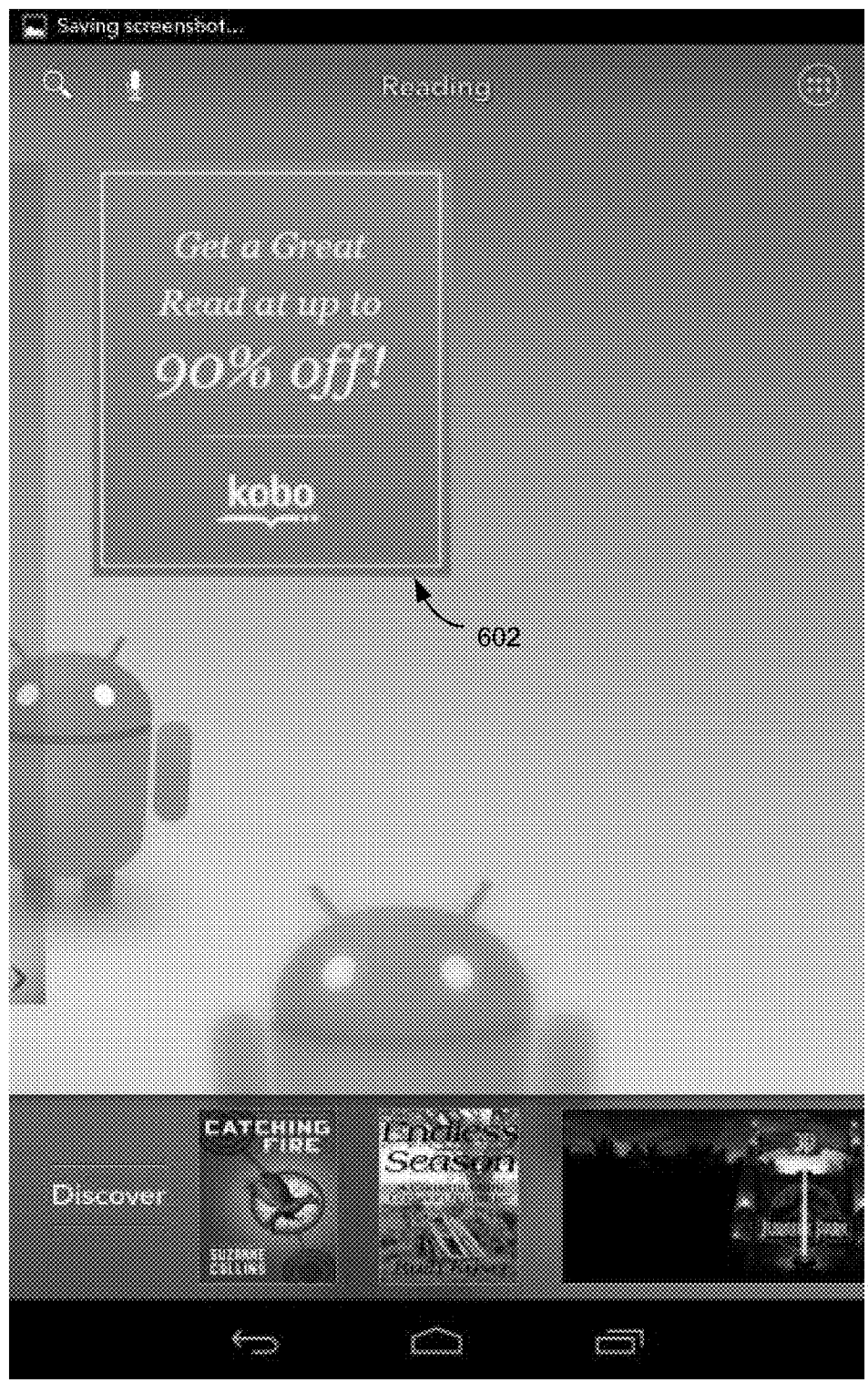
FIG. 6 shows an exemplary graphical user interface of a multimedia container comprising a promotional object in accordance with one embodiment of the present invention.

FIG. 6 shows an exemplary graphical user interface of a multimedia container comprising a promotional object in accordance with one embodiment of the present invention. Exemplary graphical user interface 600 depicts an exemplary promotional offer or coupon (e.g., link or piece of content) within a reading multimedia container. Exemplary graphical user interface 600 includes coupon 602. In one embodiment, upon selection of coupon 602, an electronic book store application is launched (e.g., and a promo code is applied inside the electronic book store). In one exemplary embodiment, the electronic book store displays electronic books at various levels of discounts. Coupon 602 may be displayed to a user who has not recently purchased an electronic book and is in a particular geographic location or area (e.g., based on global positioning system (GPS) information).

Figure 7:
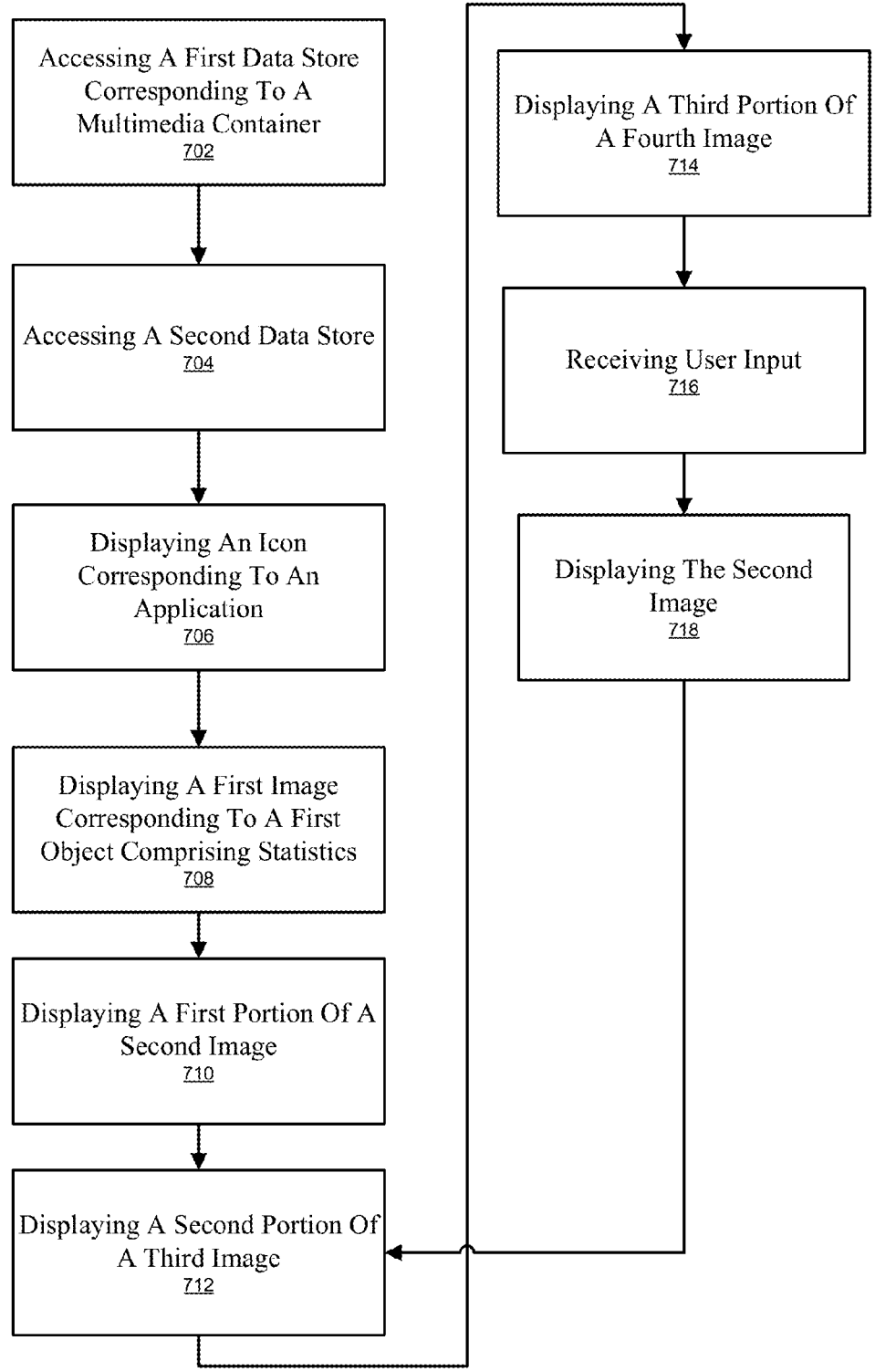
FIG. 7 shows a flowchart of an exemplary computer controlled process for generating a graphical user interface for navigating a user's library in accordance with one embodiment of the present invention.
Figure 8:
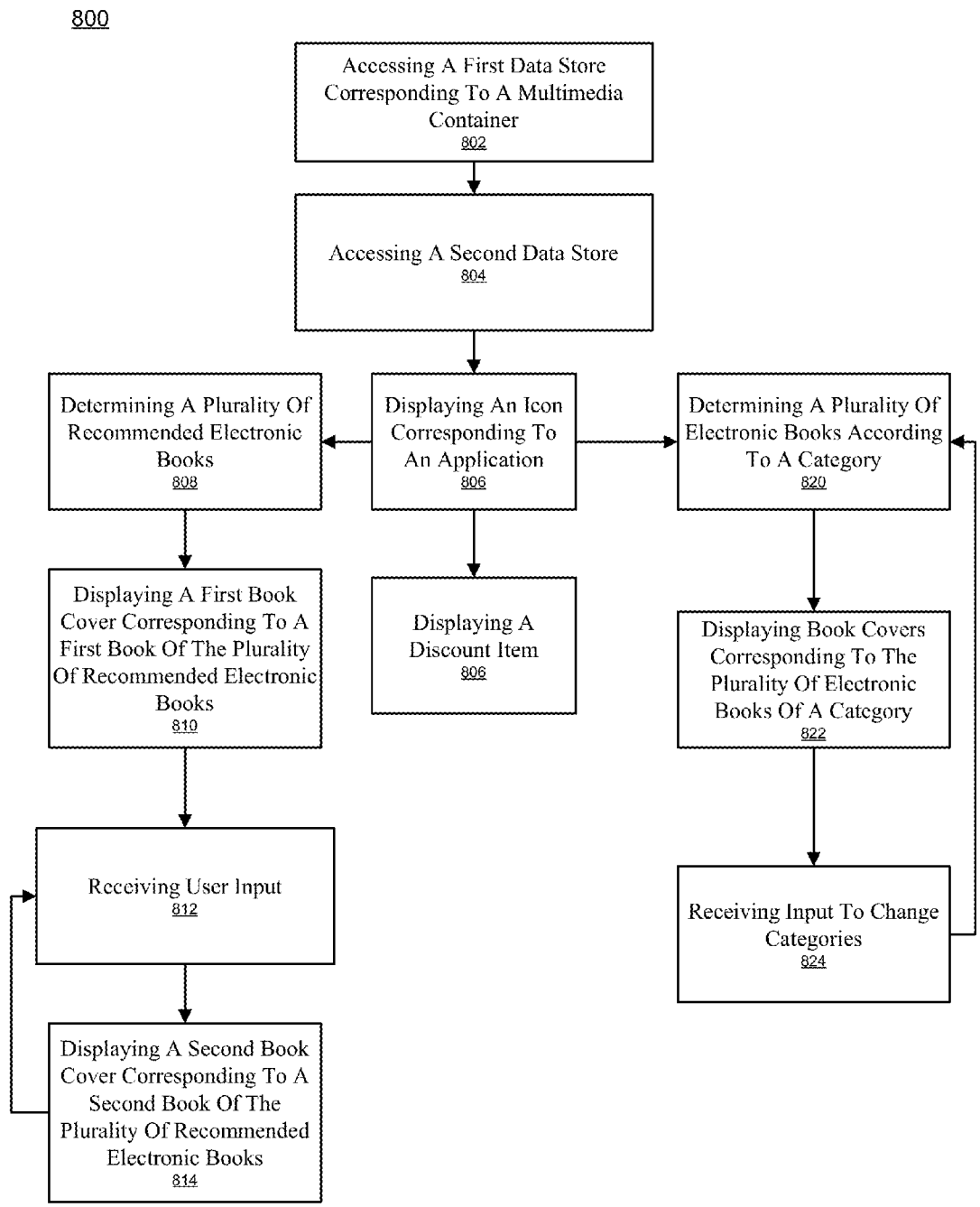
FIG. 8 shows a flowchart of an exemplary computer controlled process for generating a graphical user interface for browsing electronic books in accordance with one embodiment of the present invention.

With reference to FIGS. 7-8, flowcharts 700-800 illustrate example functions used by various embodiments of the present invention for displaying graphical user interfaces. Although specific function blocks ("blocks") are disclosed in flowcharts 700-800, such steps are examples. That is, embodiments are well suited to performing various other blocks or variations of the blocks recited in flowcharts 700-800. It is appreciated that the blocks in flowcharts 700-800 may be performed in an order different than presented, and that not all of the blocks in flowcharts 700-800 may be performed.

FIG. 7 shows a flowchart of an exemplary computer controlled process for generating a graphical user interface for navigating a user's library in accordance with one embodiment of the present invention. In one exemplary embodiment, FIG. 7 depicts a process of generating a graphical user interface of a widget operable for browsing a user's electronic library or portion thereof and operable for displaying statistics related to each respective electronic book in the user's library.

At block 702, a first data store corresponding to a multimedia container is accessed. In one embodiment, the first data store is within a mobile device and the first data store corresponds to a multimedia container. The multimedia container comprises a first object and the multimedia container is operable to comprise one or more applications, widgets, and pieces of content. In one embodiment, the multimedia container is a reading related multimedia container, as described herein.

At block 704, a second data store is accessed. In one embodiment, the second data store comprises data corresponding to a first electronic book. In one exemplary embodiment, the second data store corresponds to a user's library of electronic books.

At block 706, an icon corresponding to an application is optionally displayed. In one embodiment, the multimedia container further comprises a second object which is an application. In one exemplary embodiment, the icon corresponds to an electronic book related application (e.g., electronic book library access application, electronic book store application, electronic book user profile application, and an electronic book help application). The icon corresponding to the application may be displayed to the left side of a multimedia container, as described herein.

At block 708, a first image corresponding to a first object (e.g., widget) is displayed. In one embodiment, the first image comprises a first book cover image corresponding to the first electronic book and further comprises a first statistic (or piece of access data) corresponding to the first electronic book. The first statistic may be related to access of the first electronic book. In one exemplary embodiment, the object is a widget and the first image comprises a book cover corresponding to an electronic book and statistics related to access (e.g., by a user) of the electronic book. The first statistic may comprise a percent complete of the electronic book. The first image may further comprise a second statistic of a reading time of the electronic book. The first image may further comprise a third statistic of a time remaining to complete the electronic book. In one embodiment, the third statistic is based on a rate that a user is reading the electronic book. In one exemplary embodiment, the first image further comprises a second book cover image corresponding to a second electronic book and the second electronic book is a recommended book.

At block 710, a first portion of a second image is displayed. In one embodiment, the second image corresponds to a second electronic book and the first portion of the second image comprises a portion of a second book cover image corresponding to the second electronic book (e.g., FIG. 3A). In one exemplary embodiment, a second portion of the second image is covered by the first image and the first image and the second image are in a stacked configuration (e.g., FIG. 3A).

At block 712, a second portion of a third image is displayed. In one embodiment, third image corresponds to a third electronic book and the second portion of the third image comprises a portion of a third book cover image corresponding to the third electronic book (e.g., FIG. 3A).

At block 714, a third portion of a fourth image is displayed. In one embodiment, fourth image corresponds to a fourth electronic book and the third portion of the fourth image comprises a portion of a fourth book cover image corresponding to the fourth electronic book (e.g., FIG. 3A).

At block 716, user input is received. In one exemplary embodiment, a user swipes or drags the first image in a downward or upward motion (e.g., FIGS. 3A and 4B).

At block 718, the second image is displayed. In one embodiment, the second image is completely displayed and the second image includes the second book cover image corresponding to the second electronic book and statistics related to a user's access of the second electronic book (e.g., FIG. 3A).

FIG. 8 shows a flowchart of an exemplary computer controlled process for generating a graphical user interface for browsing electronic books in accordance with one embodiment of the present invention. In one exemplary embodiment, FIG. 8 depicts a process of generating graphical user interfaces of one or more widgets operable for displaying and allowing selection of one or more electronic books (e.g., displayed within a multimedia container).

At block 802, a first data store corresponding to a multimedia container is accessed. In one embodiment, the multimedia container is a reading related multimedia container, as described herein.

At block 804, a second data store is accessed. In one embodiment, the second data store corresponds to a user's library of electronic books.

At block 806, an icon corresponding to an application is optionally displayed. In one embodiment, the icon corresponds to an electronic book related application (e.g., electronic book library access application, electronic book store application, electronic book user profile application, and an electronic book help application).

At block 808, a plurality of recommended electronic books is determined. In one embodiment, the recommended electronic books are determined based on the electronic books in a user's library and the objects (e.g., applications, widgets, and pieces of content) within one or more multimedia containers (e.g., a reading multimedia container).

At block 810, a first book cover corresponding to a first book of the plurality of recommended electronic books is displayed. In one exemplary embodiment, the first book cover is displayed as part of a recommended books widget operable for displaying a plurality of book cover images and allowing a user to navigate (e.g., via a swiping or flicking motion upward, downward, or sideways) through the plurality of book covers.

At block 812, user input is received. In one exemplary embodiment, a user swipes or drags the first image in a downward or upward motion (e.g., FIG. 4B).

At block 814, a second book cover corresponding to a second book of the plurality of recommended books is displayed. The second book cover may be displayed by a recommended books widget upon a swiping of the first book cover image.

At block 820, a plurality of electronic books according to a category is determined. As described herein, exemplary categories may include featured books, top fifty books, electronic books with a pulse, and new releases.

At block 822, one or more book covers corresponding to the plurality of electronic books of the category are displayed (e.g., FIG. 5). Each of the electronic book cover images may be selectable and operable to launch an electronic book store or marketplace application allowing a user to purchase and/or download the electronic book corresponding to the selected book cover image.

At block 824, an input to change categories is received. In one exemplary embodiment, the input to change categories is received via navigation buttons or icons (e.g., navigation icons 506a-b).

At block 830, a discount item or coupon image is displayed. In one exemplary embodiment, the coupon is selectable and in response to selection an electronic book store or marketplace is launched that is organized according to an amount of discount that is applied.

Figure 9:
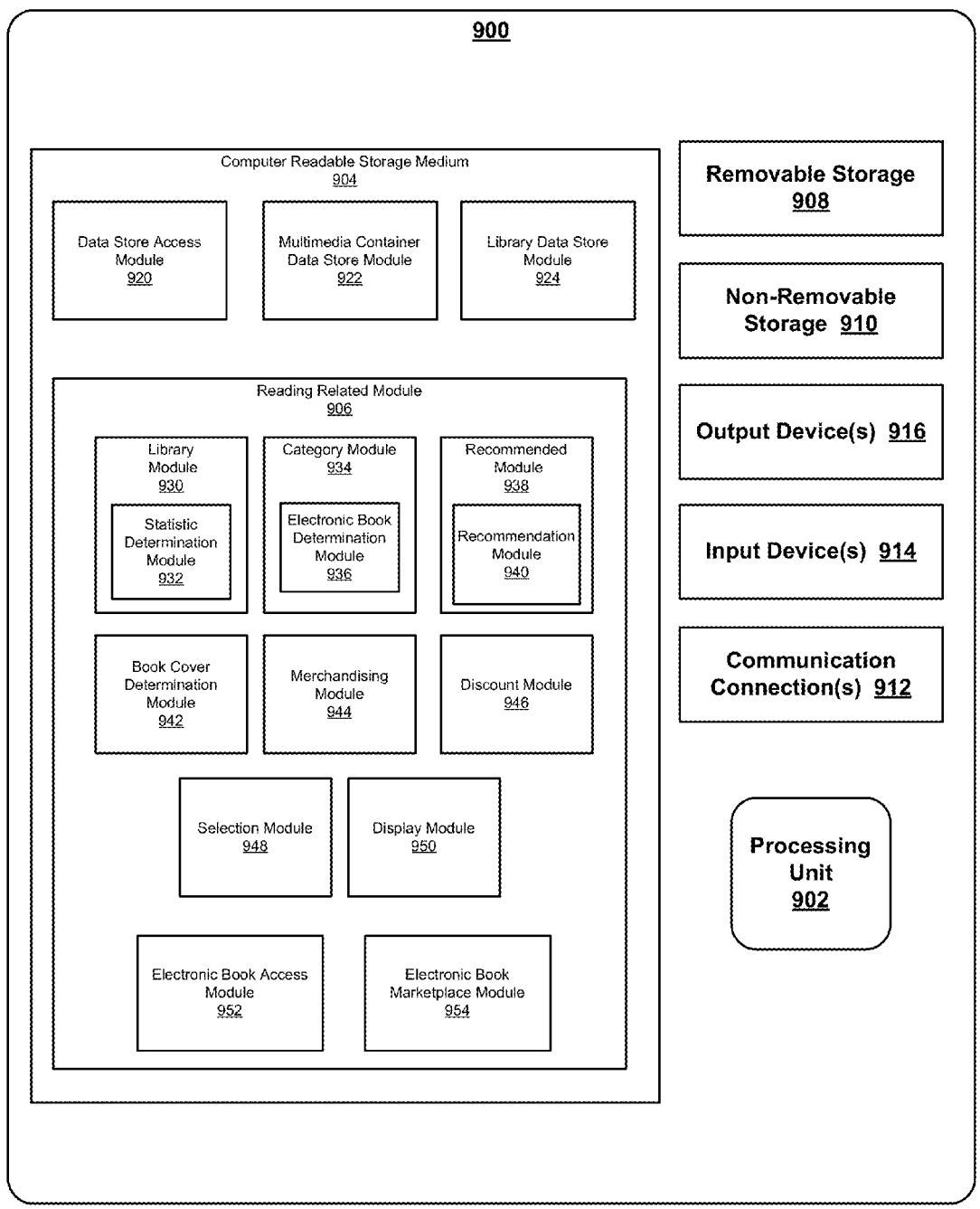
FIG. 9 shows a block diagram of exemplary computing system and corresponding modules, in accordance with one embodiment of the present invention.

FIG. 9 illustrates exemplary components used by various embodiments of the present invention. Although specific components are disclosed in computing system environment 900, it should be appreciated that such components are exemplary. That is, embodiments of the present invention are well suited to having various other components or variations of the components recited in computing system environment 900. It is appreciated that the components in computing system environment 900 may operate with other components than those presented, and that not all of the components of system 900 may be required to achieve the goals of computing system environment 900.

FIG. 9 shows a block diagram of exemplary computer system and corresponding modules, in accordance with one embodiment of the present invention. With reference to FIG. 9, an exemplary system module for implementing embodiments includes a general purpose computing system environment, such as computing system environment 900. Computing system environment 900 may include, but is not limited to, servers, desktop computers, laptops, tablet PCs, tablet computing devices, mobile devices, and smartphones. In its most basic configuration, computing system environment 900 typically includes at least one processing unit 902 and computer readable storage medium 904. Depending on the exact configuration and type of computing system environment, computer readable storage medium 904 may be volatile (such as RAM), non-volatile (such as ROM, flash memory, etc.) or some combination of the two. Portions of computer readable storage medium 904 when executed facilitate efficient execution of memory operations or requests for groups of threads. Computing system environment 900 may further include a power source (e.g., battery) (not shown) operable to allow computing system environment 900 to be movable and mobile while operating.

Additionally, computing system environment 900 may also have additional features/functionality. For example, computing system environment 900 may also include additional storage (removable and/or non-removable) including, but not limited to, magnetic or optical disks or tape. Such additional storage is illustrated in FIG. 10 by removable storage 908 and non-removable storage 910. Computer storage media includes volatile and nonvolatile, removable and non-removable media implemented in any method or technology for storage of information such as computer readable instructions, data structures, program modules or other data. Computer readable medium 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 900. Any such computer storage media may be part of computing system environment 900.

Computing system environment 900 may also contain communications connection(s) 912 that allow it to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 912 may allow computing system environment 900 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), Near Field Communication (NFC), Code Division Multiple Access (CDMA), Global System for Mobile Communications (GSM), Long-term Evolution (LTE), Worldwide Interoperability for Microwave Access (WiMax), wide area networks (WAN) such as the internet, serial, and universal serial bus (USB). It is appreciated the various network types that communication connection(s) 912 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 900 may also have input device(s) 914 such as a touch screen (e.g., capacitive touch screen), keyboard, mouse, pen, voice input device, touch input device, remote control, camera, etc. Output device(s) 916 such as a display (e.g., touch screen), speakers, etc. may also be included. All these devices are well known in the art and are not discussed at length.

In one embodiment, computer readable storage medium 904 includes data store access module 920, multimedia container data store module 922, library data store module 924, and reading related module 906.

Data store access 920 module is operable to access multimedia container data store module 922 and library data store module 924 (e.g., based on a request from reading related module 906). Multimedia container data store module 922 is operable to store data corresponding to a multimedia container (e.g., a reading multimedia container), as described herein. Library data store module 924 is operable to store data related to and including electronic books of a user's (e.g., personal and/or locally stored) library. Library data store module 924 may include access information about each of the electronic books in a user's library.

Reading related module 906 includes library module 930, category module 934, recommended module 938, book cover determination module 942, merchandising module 944, discount module 946, selection module 948, display module 950, electronic book access module 952, and electronic book marketplace module 954.

Library module 930 is operable to facilitate displaying (e.g., via display module 950) book covers and statistics related to each of a plurality of electronic books in a user's library. In one exemplary embodiment, library module 930 is implemented as a widget (e.g., FIG. 3A). Library module 930 includes statistic determination module 932. Statistic determination module 932 is operable to compute a respective plurality of statistics related to access of a respective electronic book. In one embodiment, the respective plurality of statistics comprises a percent completed, a reading time, and a time remaining, as described herein.

Category module 934 is operable to facilitate display of book covers of a respective plurality of electronic books for each of a plurality of categories and allow navigation of the plurality of categories. In one exemplary embodiment, category module 934 is implemented as a widget (e.g., FIG. 5). Category module 934 includes electronic book determination module 936. Electronic book determination module 936 is operable to determine a respective plurality of electronic books for each respective category of a plurality of categories, as described herein.

Recommended module 938 is operable to facilitate display of book covers of a plurality of recommended electronic books, as described herein. In one exemplary embodiment, recommended module 938 is implemented as a widget (e.g., FIG. 4A). Recommended module 938 includes recommendation module 940. Recommendation module 940 is operable to determine a respective recommended electronic book corresponding to the respective electronic book.

Discount module 946 is operable to facilitate display of a coupon or promotional item (e.g., within a reading multimedia container), as described herein. Merchandising module 944 is operable to facilitate display of a respective book cover image corresponding to each electronic book that is for sale, as described herein. In one exemplary embodiment, merchandising module 944 is operable to facilitate display of a plurality of book covers on a shelf.

Display module 950 is operable to display a respective image for each of the plurality of electronics books. In one embodiment, the respective image comprises a respective book cover image corresponding to the respective electronic book and the respective plurality of statistics. The respective image may further comprise a second respective book cover image corresponding to the respective recommended electronic book. Display module 950, in response to a user interaction, is further operable to display a next respective image for a next respective electronic book, where the plurality of electronic books is ordered according to most recent access.

Book cover determination module 942 is operable to determine respective book cover images for library module 930, category module 934, recommended module 938, merchandising module 944, and discount module 946.

Selection module 948 is operable to receive user interactions (e.g., touches, presses, swipes, etc.) with images displayed based on the library module 930, category module 934, recommended module 938, merchandising module 944, and discount module 946.

Electronic book access module 952 is operable to access and facilitate display of electronic books. Electronic book marketplace module 954 is operable to access and facilitate purchases and/or downloads of electronic books.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for rendering a graphical user interface, said method comprising:
   accessing, within a mobile device, a first data store corresponding to a multimedia container, wherein said multimedia container comprises a first object, wherein said multimedia container comprises objects corresponding to one or more applications, widgets, and pieces of content;

accessing a second data store wherein said second data store comprises data corresponding to a first electronic book; and displaying a first image corresponding to said first object, wherein said first image comprises a first book cover image corresponding to said first electronic book, and wherein said first image further comprises a first statistic corresponding to said first electronic book, the first statistic indicating an amount of time remaining to finish reading the electronic book, the first statistic being computed based on a user's prior rate of reading of the first electronic book.

2. The method as described in claim 1, wherein said first statistic comprises a percent complete of said electronic book.

3. The method as described in claim 2, wherein said first image further comprises a second statistic of a reading time of said electronic book.

4. The method as described in claim 1, wherein said first image further comprises a second book cover image corresponding to a second electronic book, and wherein said second electronic book is a recommended book.

5. The method as described in claim 1, wherein said first object is a widget.

6. The method as described in claim 1, wherein said multimedia container further comprises a second object, wherein said second object is an application, and further comprising:

displaying an icon corresponding to said application to the left of said first image.

7. A non-transitory computer-readable storage medium having stored thereon, computer executable instructions that, if executed by a computer system cause the computer system to perform a method for displaying a graphical user interface, said method comprising:

displaying, on a mobile device, a first image comprising a first book cover corresponding to a first electronic book, wherein said first image further comprises a first statistic related to said first electronic book, said first statistic indicating an amount of time remaining to finish reading the first electronic book, the first statistic being computed based on a user's prior rate of reading of the first electronic book;

displaying a first portion of a second image wherein a second image comprises a second book cover corresponding to a second electronic book;

in response to an interaction with said first image, displaying said second image, wherein said second image further comprises a second statistic related to said second electronic book, said second statistic indicating an amount of time remaining to finish reading the second electronic book, the second statistic being computed based on the user's prior rate of reading of the second electronic book.

8. The non-transitory computer-readable storage medium as described in claim 7, said method further comprising:

displaying a third image comprising a third book cover corresponding to a third electronic book and a fourth book cover corresponding to a fourth electronic book, wherein a user's library comprises said first electronic book, second electronic book, third electronic book, and fourth electronic book.

9. The non-transitory computer-readable storage medium as described in claim 7, wherein said interaction with said first image comprises a swiping motion.

10. The non-transitory computer-readable storage medium as described in claim 7, wherein a second portion of said second image is covered by said first image, and wherein the first image and said second image are in a stacked configuration.

11. The non-transitory computer-readable storage medium as described in claim 7, wherein said first statistic further comprises a percent complete of said electronic book.

12. The non-transitory computer-readable storage medium as described in claim 11, wherein said first statistic further comprises a reading time of said first electronic book.

13. A system comprising:
a processing circuit; and
a display device coupled to said processing circuit;
the processing circuit rendering a graphical user interface, said processing circuit being configured to:
access a data store corresponding to a plurality of electronic books;
compute a respective plurality of statistics related to access of a respective electronic book; and
display a respective image for each of said plurality of electronics books, wherein said respective image comprises a respective book cover image corresponding to said respective electronic book and a display of said respective plurality of statistics, said display of said respective plurality of statistics including a statistic indicating an amount of time remaining to finish reading said respective electronic book, the statistic being computed based on a user's prior rate of reading of said respective electronic book.

14. The system as described in claim 13, wherein the processing circuit is further configured to:
determine a respective recommended electronic book corresponding to said respective electronic book, wherein said respective image further comprises a second respective book cover image corresponding to said respective recommended electronic book.

15. The system as described in claim 13, wherein in response to a user interaction, said display module is operable to display a next respective image for a next respective electronic book, wherein said plurality of electronic books are ordered according to most recent access.

16. The system as described in claim 13, wherein said respective plurality of statistics comprises at least one of a percent completed and a reading time.

17. The method as described in claim 1, further comprising:
updating the first statistic each time the user accesses the first electronic book.

* * * * *